US010444593B2

(12) United States Patent
Mekis et al.

(10) Patent No.: US 10,444,593 B2
(45) Date of Patent: Oct. 15, 2019

(54) METHOD AND SYSTEM FOR A VERTICAL JUNCTION HIGH-SPEED PHASE MODULATOR

(71) Applicant: Luxtera, Inc., Carlsbad, CA (US)

(72) Inventors: Attila Mekis, Carlsbad, CA (US); Subal Sahni, La Jolla, CA (US); Yannick De Koninck, Mechelen (BE); Gianlorenzo Masini, Carlsbad, CA (US); Faezeh Gholami, Guttenberg, NJ (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 15/694,236

(22) Filed: Sep. 1, 2017

(65) Prior Publication Data

US 2018/0059504 A1  Mar. 1, 2018

Related U.S. Application Data

(60) Provisional application No. 62/382,326, filed on Sep. 1, 2016.

(51) Int. Cl.
  *G02B 1/00* (2006.01)
  *G02F 1/225* (2006.01)
  (Continued)

(52) U.S. Cl.
  CPC ............ *G02F 1/2257* (2013.01); *G02F 1/025* (2013.01); *G02F 2001/212* (2013.01); *G02F 2201/063* (2013.01); *G02F 2201/12* (2013.01)

(58) Field of Classification Search
  CPC .................................. G02B 6/00; G02F 1/225
  (Continued)

(56) References Cited

U.S. PATENT DOCUMENTS

| 4,615,032 A * | 9/1986 | Holbrook | H01S 5/20 |
| | | | 372/45.01 |
| 5,333,000 A * | 7/1994 | Hietala | G02F 2/02 |
| | | | 342/368 |

(Continued)

FOREIGN PATENT DOCUMENTS

DE   102014219295   3/2016

OTHER PUBLICATIONS

International Search Report and the Written Opinion of the International Searching Authority for International PCT Application No. PCT/US2017/049880; International Filing date Sep. 1, 2017; dated Nov. 28, 2017.

*Primary Examiner* — Kaveh C Kianni
(74) *Attorney, Agent, or Firm* — McAndrews, Held & Malloy

(57) ABSTRACT

Methods and systems for a vertical junction high-speed phase modulator are disclosed and may include a semiconductor device having a semiconductor waveguide including a slab section, a rib section extending above the slab section, and raised ridges extending above the slab section on both sides of the rib section. The semiconductor device has a vertical pn junction with p-doped material and n-doped material arranged vertically with respect to each other in the rib and slab sections. The rib section may be either fully n-doped or p-doped in each cross-section along the semiconductor waveguide. Electrical connection to the p-doped and n-doped material may be enabled by forming contacts on the raised ridges, and electrical connection may be provided to the rib section from one of the contacts via periodically arranged sections of the semiconductor waveguide, where a cross-section of both the rib section and the slab section in the periodically arranged sections may be fully n-doped or fully p-doped.

14 Claims, 13 Drawing Sheets

(51) Int. Cl.
*G02F 1/025* (2006.01)
*G02F 1/25* (2006.01)
*G02F 1/21* (2006.01)

(58) Field of Classification Search
USPC .................................................. 385/3, 14
See application file for complete search history.

(56) References Cited

U.S. PATENT DOCUMENTS

| | | | | |
|---|---|---|---|---|
| 5,917,972 | A * | 6/1999 | Davies | H01S 5/026 372/50.22 |
| 6,229,947 | B1 * | 5/2001 | Vawter | G02B 6/1228 385/131 |
| 6,298,177 | B1 * | 10/2001 | House | G02F 1/025 385/3 |
| 9,329,415 | B2 * | 5/2016 | Song | G02F 1/025 |
| 2003/0123829 | A1 * | 7/2003 | Taylor | H01L 29/7785 385/131 |
| 2008/0260320 | A1 * | 10/2008 | Laval | G02F 1/025 385/2 |
| 2012/0033910 | A1 * | 2/2012 | Morini | G02F 1/025 385/3 |
| 2014/0111793 | A1 * | 4/2014 | Asghari | G01J 1/0425 356/73 |
| 2014/0127842 | A1 * | 5/2014 | Song | G02F 1/025 438/31 |
| 2014/0286647 | A1 | 9/2014 | Ayazi et al. | |
| 2015/0049978 | A1 * | 2/2015 | Fujikata | G02F 1/025 385/3 |
| 2015/0316793 | A1 | 11/2015 | Ayazi et al. | |
| 2015/0381283 | A1 | 12/2015 | Sahni et al. | |
| 2016/0290891 | A1 * | 10/2016 | Feng | G01M 11/30 |
| 2017/0254955 | A1 * | 9/2017 | Poon | G02B 6/1347 |
| 2017/0299902 | A1 * | 10/2017 | Yu | G02F 1/21 |
| 2018/0217469 | A1 * | 8/2018 | Yu | G02F 1/2257 |

\* cited by examiner

METHOD AND SYSTEM FOR A VERTICAL JUNCTION HIGH-SPEED PHASE MODULATOR

CROSS-REFERENCE TO RELATED APPLICATIONS/INCORPORATION BY REFERENCE

This application claims priority to and the benefit of U.S. Provisional Application 62/382,326 filed on Sep. 1, 2016, which is hereby incorporated herein by reference in its entirety.

FIELD

Aspects of the present disclosure relate to electronic components. More specifically, certain implementations of the present disclosure relate to methods and systems for a vertical junction high-speed phase modulator.

BACKGROUND

Conventional approaches for high-speed phase modulators may be costly, cumbersome, and/or inefficient—e.g., they may be complex and/or time consuming, and/or may introduce asymmetry.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a vertical junction high-speed phase modulator, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
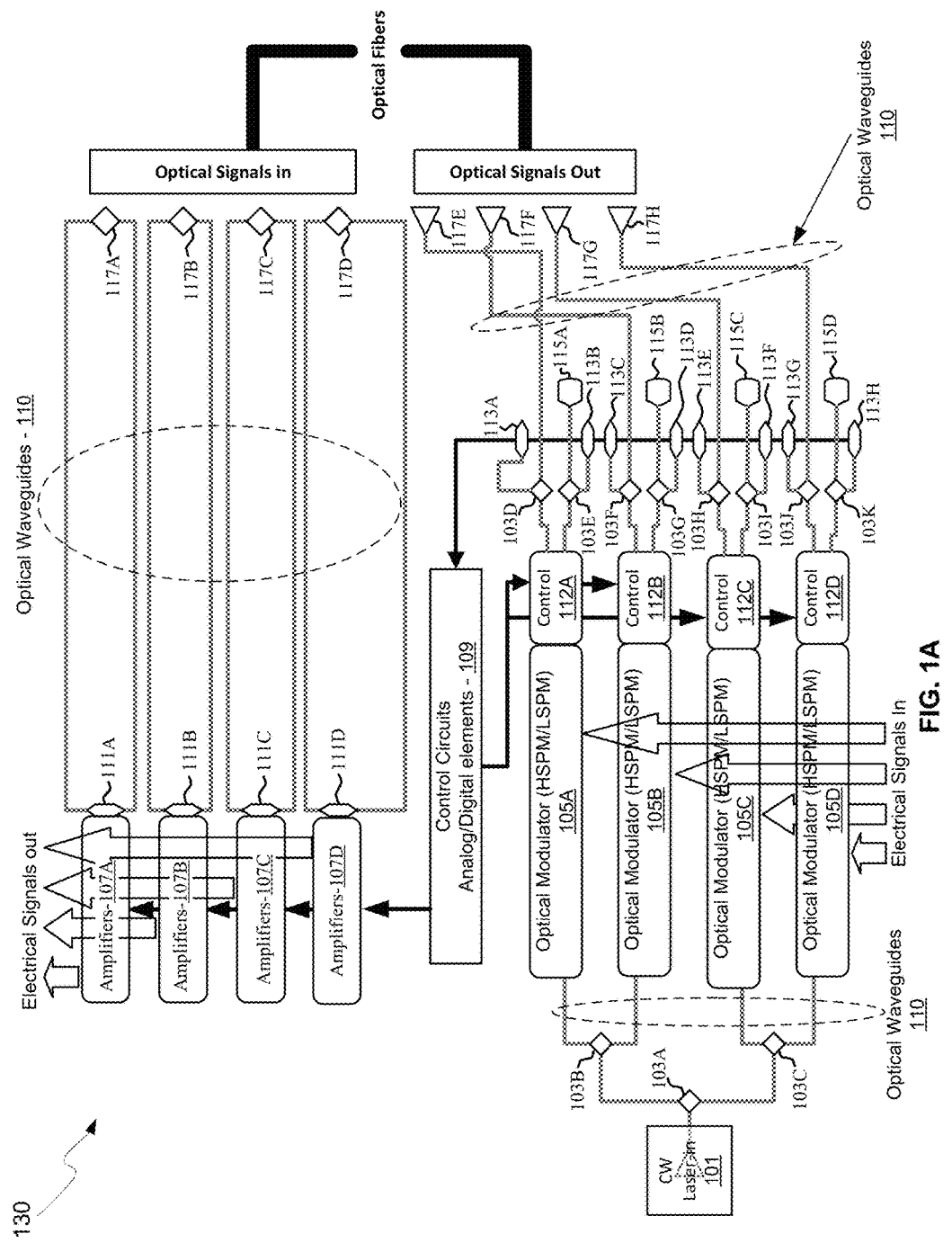
FIG. 1A is a block diagram of a photonically-enabled integrated circuit with a vertical junction high-speed phase modulator, in accordance with an example embodiment of the disclosure.

FIG. 1A is a block diagram of a photonically-enabled integrated circuit with a vertical junction high-speed phase modulator, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more CW optical signals to the coupler 103A. The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the tens of Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
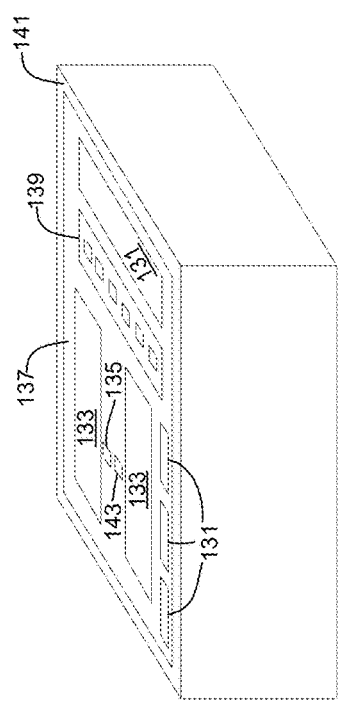
FIG. 1B is a diagram illustrating an exemplary photonically-enabled integrated circuit, in accordance with an example embodiment of the disclosure.
Figure 1B:
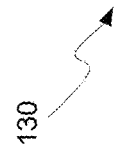

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

In the receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

Optical modulators may be used to impart a data signal onto a CW optical signal. Rib waveguide sections with integrated PN junctions may be utilized in MZI modulators, and are shown further with respect to FIGS. 2-10.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113H.

Figure 1C:
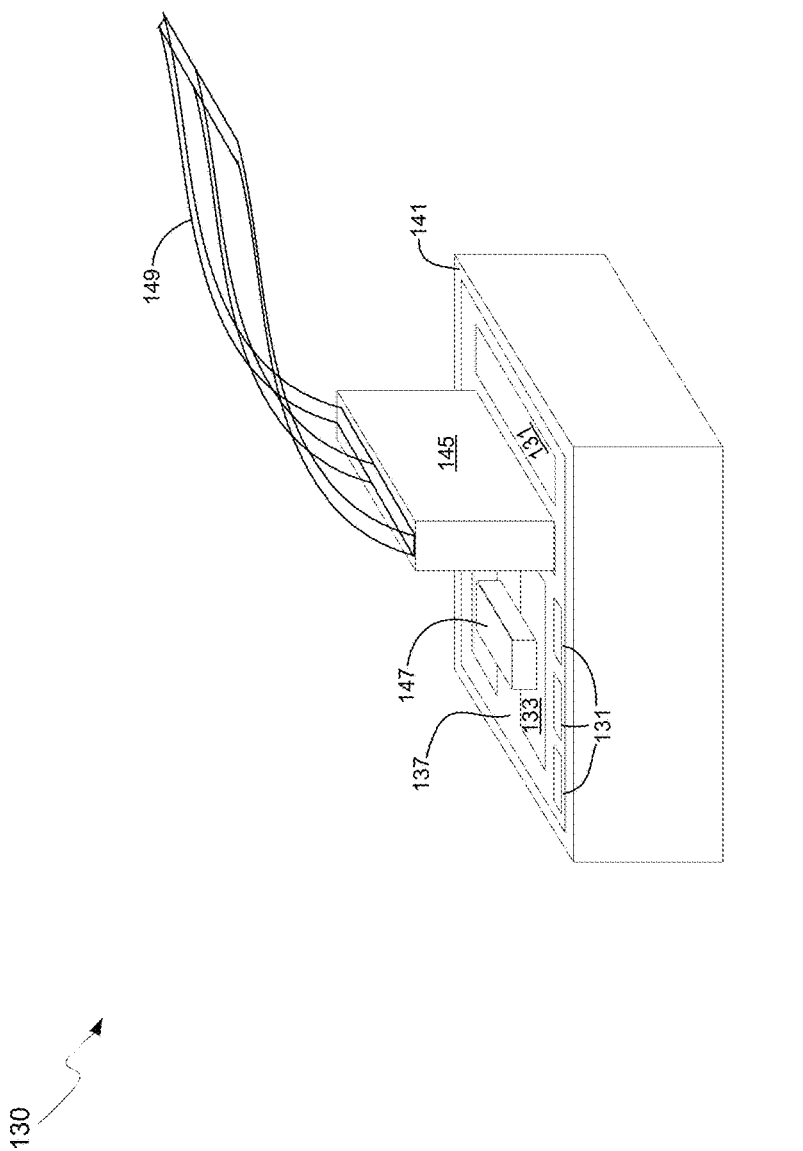
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

Figure 2A:
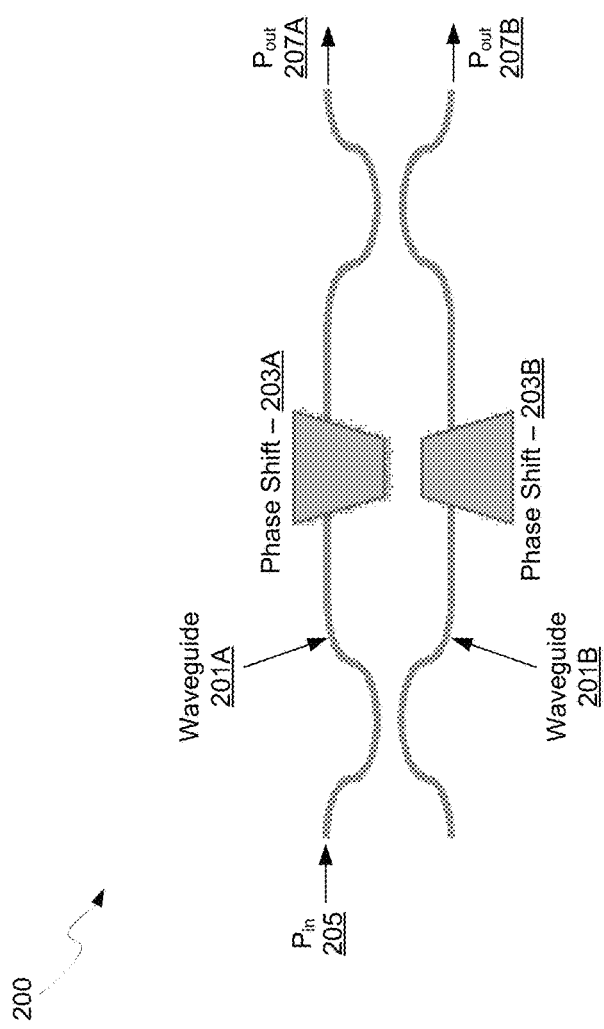
FIG. 2A is a schematic illustrating an electro-optic modulator, in accordance with an example embodiment of the disclosure.

FIG. 2A is a schematic illustrating an electro-optic modulator, in accordance with an example embodiment of the disclosure. Referring to FIG. 2A, there is shown an optical modulator 200 comprising optical waveguides 201A and 201B and optical phase shifters 203A and 203B. There is also shown an input signal $P_{in}$ 205 and output signals $P_{out}$ 207A and 207B.

The waveguides 201A and 201B may comprise materials of differing dielectric constants such that optical signals are confined. For example, a silicon waveguide with air and/or silicon dioxide cladding may carry optical signals and may come into close proximity at two locations in the optical modulator 200 as shown in FIG. 2A, which may result in a transfer of a portion of the optical mode from one waveguide to the other.

The optical phase shifters 203A and 203B may comprise optoelectronic devices that may be operable to shift the phase of received optical signals. For example, p-n junctions formed in the waveguides 201A and 201B may be utilized to shift the phase of optical signals that travel through the depletion region, since the index of refraction is changed with respect to the non-depleted regions of the waveguides. Reverse-biased p-n junctions result in an increased depletion width and thus more phase shift.

Optical modulation amplitude (OMA) is one of the key performance parameters of an electro-optic phase modulator used in digital communication systems. The OMA directly influences the system bit error rate (BER) and hence is desired to be as large as possible. In bi-level optical signaling schemes, the higher level represents a binary one, and the lower power level represents a zero (maximum and minimum of $P_{out}$ in FIG. 2A). OMA is defined as the difference between the high and low levels: OMA=max $(P_{out})$−min$(P_{out})$.

The magnitude of OMA depends on phase shift difference accumulated between the two arms, waveguides 201A and 201B, of the optical modulator 200 as well as the optical loss that the beam suffers passing through the waveguides. The following equation describes this relation:

$$OMA(L) = P_{in} e^{-\alpha \cdot L} \sin(\theta \cdot L)$$

where $P_{in}$ is the input optical power, $\alpha$ is the optical loss per unit length, L is the length of the modulator and $\theta$ is the difference in phase shift between two arms per unit length. As can be seen from the relation, OMA increases with increasing phase shift and decreases by increasing loss. As a result, there is an optimal modulator length, beyond which the OMA no longer improves.

Figure 2B:
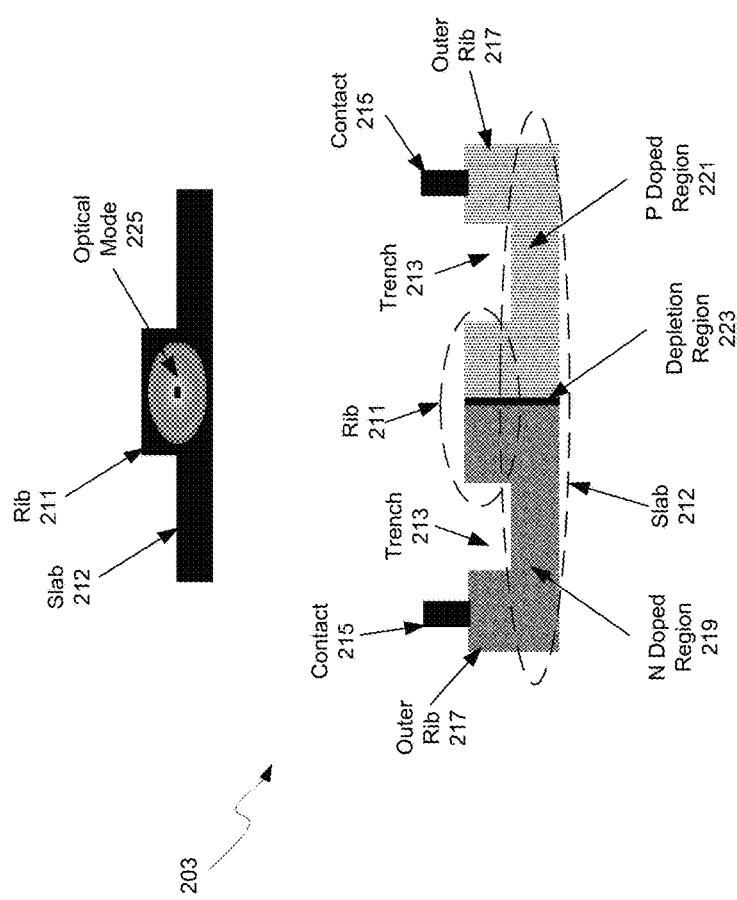
FIG. 2B illustrates a cross-section view of a phase modulating region, in accordance with an example embodiment of the disclosure.

FIG. 2B illustrates a cross-section view of a phase modulating region, in accordance with an example embodiment of the disclosure. Referring to FIG. 2B, there is shown a rib waveguide phase shifter 203, where the upper view shows the optical mode 225 in the rib 211 and slab section 212 of the n-doped region 219 and p-doped region 221, and the lower view shows the p- and n-doped regions 219 and 221 in the rib and slab regions 211 and 212. There is also shown contacts 215 formed on outer ribs 217 separated from the rib waveguide by trenches 213.

The high-speed phase modulator (HSPM) 203 is formed where the p- and n-doped regions meet, resulting in the depletion region 223 at the interface of the n-doped region 219 and p-doped region 221. In this configuration, there is good overlap of the depletion region 223 with the optical mode 225, which results in good efficiency, when the junction is near the waveguide center. Electrical connection of each side of the junction occurs via p/n-doped regions extending through the slab region. The HSPM modulates the phase and loss of the optical mode in the waveguide, as a function of bias on the contacts.

Figures 3A, 3B, 3C:
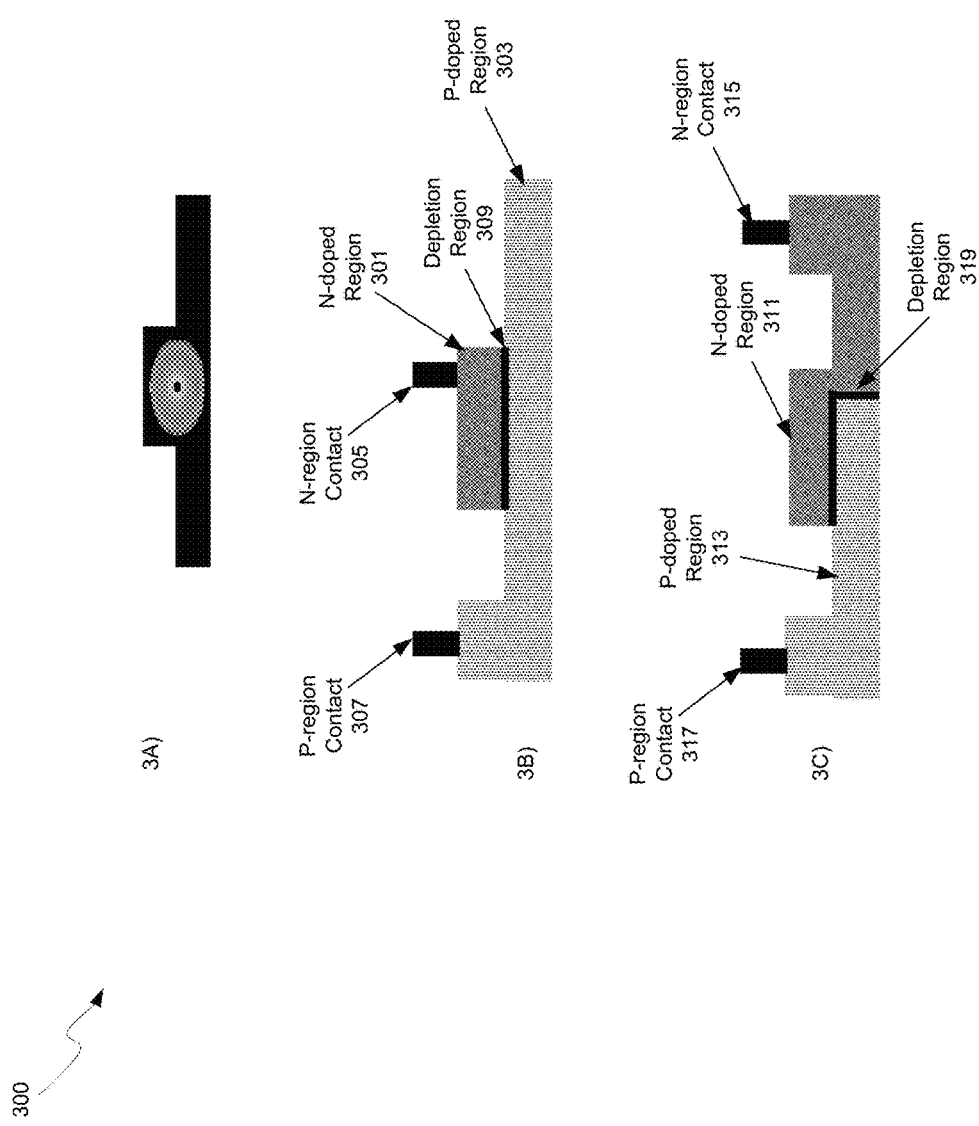
FIGS. 3A-3C illustrate an optical mode in a vertical HSPM junction and alternative contacting schemes, in accordance with an embodiment of the disclosure.

FIGS. 3A-3C illustrate an optical mode in a vertical HSPM junction and alternative contacting schemes, in accordance with an embodiment of the disclosure. Referring to FIG. 3A, there is shown an optical mode in the rib waveguide and slab regions of a HSPM. With a vertical junction, where the electric fields in the depletion region are oriented in a vertical direction, there is increased efficiency due to a better overlap between the optical mode and the depletion region. However, electrical connection to such a structure may be difficult for a vertical junction.

FIG. 3B illustrates a possible contact scenario, with n-doped region 301, p-doped region 303, n-region contact 305, p-region contact 307, and a depletion region 309 where the electric fields are oriented vertically and the n-region contact 305 is placed on the top of the rib. However, metal in the n-region contact 305 interacts with the optical mode and may significantly increase optical loss, offsetting the gain in efficiency of the vertical junction.

FIG. 3C illustrates another possible contact scenario, with n-doped region 311, p-doped region 313, n-region contact 315, p-region contact 317, and a depletion region 311 where the electric fields are oriented vertically and horizontally in an "L" shape. In this embodiment, the contacts 315 and 317 are made on n-doped and p-doped slab sections where the n-doped region 311 extends into the rib, reducing the length of the vertical junction depletion region 319. This "neck" region connecting the rib and slab portions of the n-doped region 311 results in increased resistance between the n-region contact 315 to the n-side of the PN junction, thereby reducing the modulation bandwidth. Furthermore, the wider the neck region, the shorter the vertical junction portion, which reduces modulation efficiency. Therefore a low-loss and low-resistance electrical connectivity may be difficult while retaining an efficient vertical junction.

Figure 4:
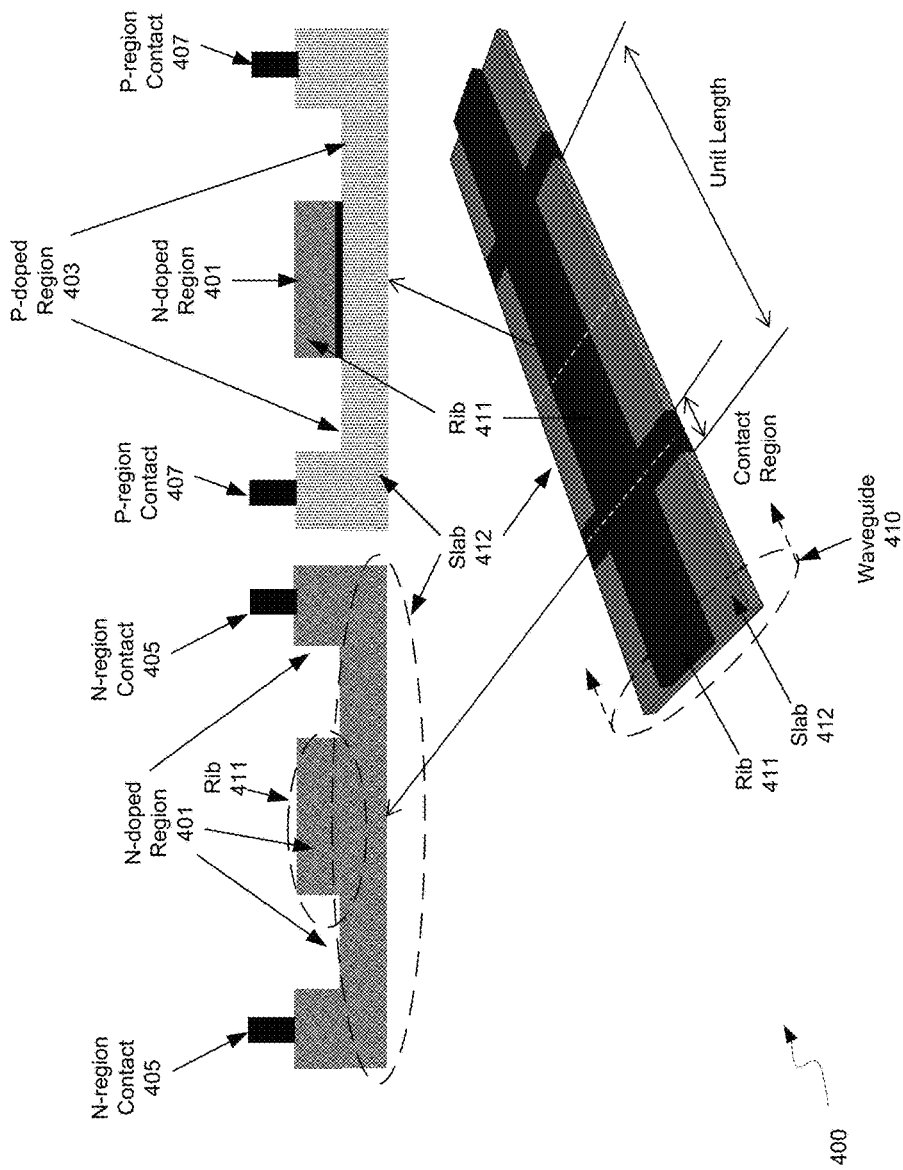
FIG. 4 illustrates an example connection scheme for a vertical junction HSPM, in accordance with an example embodiment of the disclosure.

FIG. 4 illustrates an example connection scheme for a vertical junction HSPM, in accordance with an example embodiment of the disclosure. Referring to FIG. 4, there is shown an oblique angle view of HSPM 400 with two cross-sectional views at different locations along the rib waveguide, as indicated by the arrows from the dotted lines in the oblique view directed towards the corresponding cross-sectional view.

In the embodiment shown, the junction configuration is varied along the waveguide, such that the top of the waveguide is completely n-doped, for example, through its length, where n-doped region 401 extends the entire length of the rib 411. Most of the bottom of the waveguide, in the slab section 412, is p-doped region 403, and extends the entire length of the slab 412 except for narrow regions to contact the n-doped region 401 on top. This is illustrated by the upper left image corresponding to one of the narrow stripes of n-doping in the slab region in addition to the rib, whereas the upper right view represents the rest of the length of the structure. In another example scenario, the p- and n-doped regions may be reversed with n-doped slab 412 and p-doped rib 411.

The "unit length" in the oblique view indicates the spacing between n-contact regions 405, and the contact region width is also indicated, both of which may be configured to trade off modulation efficiency, resistance, and bandwidth, for example. The p-region contacts 407 may be placed at the midpoint between the n-region contacts 405, also with varying width. The contact regions may be interspersed periodically, as in at regular distances, or in varying distances along the length of the waveguide.

Figure 5:
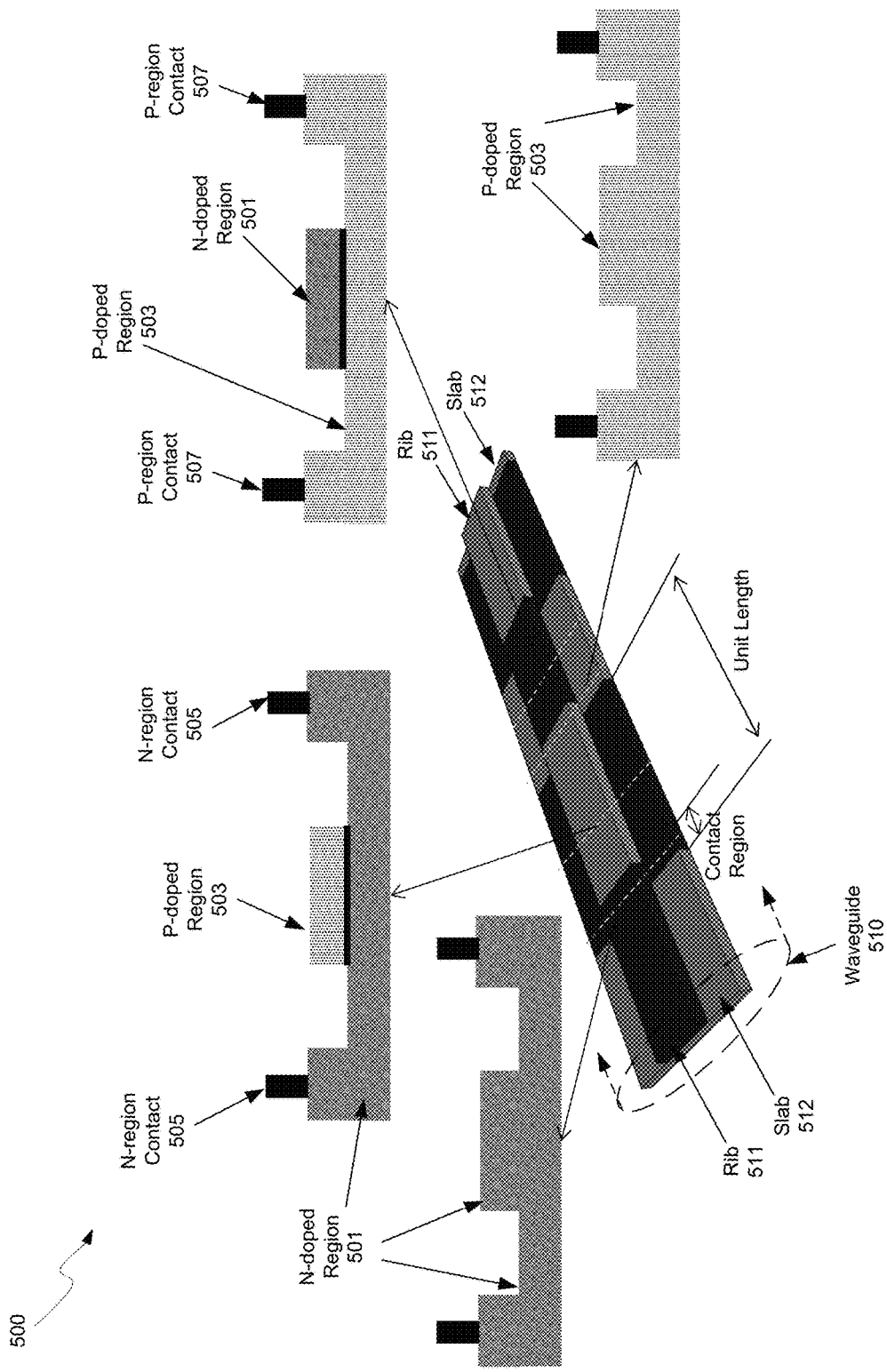
FIG. 5 illustrates another example connection scheme for a vertical junction HSPM, in accordance with an example embodiment of the disclosure.

FIG. 5 illustrates another example connection scheme for a vertical junction HSPM, in accordance with an example embodiment of the disclosure. Referring to FIG. 5, there is shown an oblique angle view of HSPM 500 with four cross-sectional views at different locations along the rib waveguide, as indicated by the arrows. There is also shown waveguide 510 comprising rib 511 and slab 512, which comprise n-doped region 501, p-doped region 503, n-region contact 505, and p-region contact 507.

In the embodiment shown, the junction configuration is varied along the waveguide 510, such that the rib 511 of the waveguide 510 is alternately doped n-type and p-type through its length, while the slab 512, is alternately doped p-type and n-type along the length of the waveguide 510. This is illustrated by the upper left and upper right cross-sectional views corresponding to the alternating doping of the rib 511, where the rib 511 is p-type in one section and n-type in the other.

The lower left and lower right cross-sectional views illustrate the contacting regions, which may be situated periodically along the length at interfaces between the alternating doped regions, with narrow stripes of uniform n-doping electrically coupling n-doped slab regions to n-doped rib sections, as illustrated in the lower left view, and narrow stripes of uniform p-doping electrically coupling p-doped slab regions to p-doped rib sections, as illustrated in the lower right view.

The "unit length" indicates the spacing between alternating doped regions, and the contact region width is also indicated, both of which may be configured to trade off modulation efficiency, resistance, and bandwidth, for example. The contact regions may be interspersed periodically, as in at regular distances, or in varying distances along the length of the waveguide.

Figure 6:
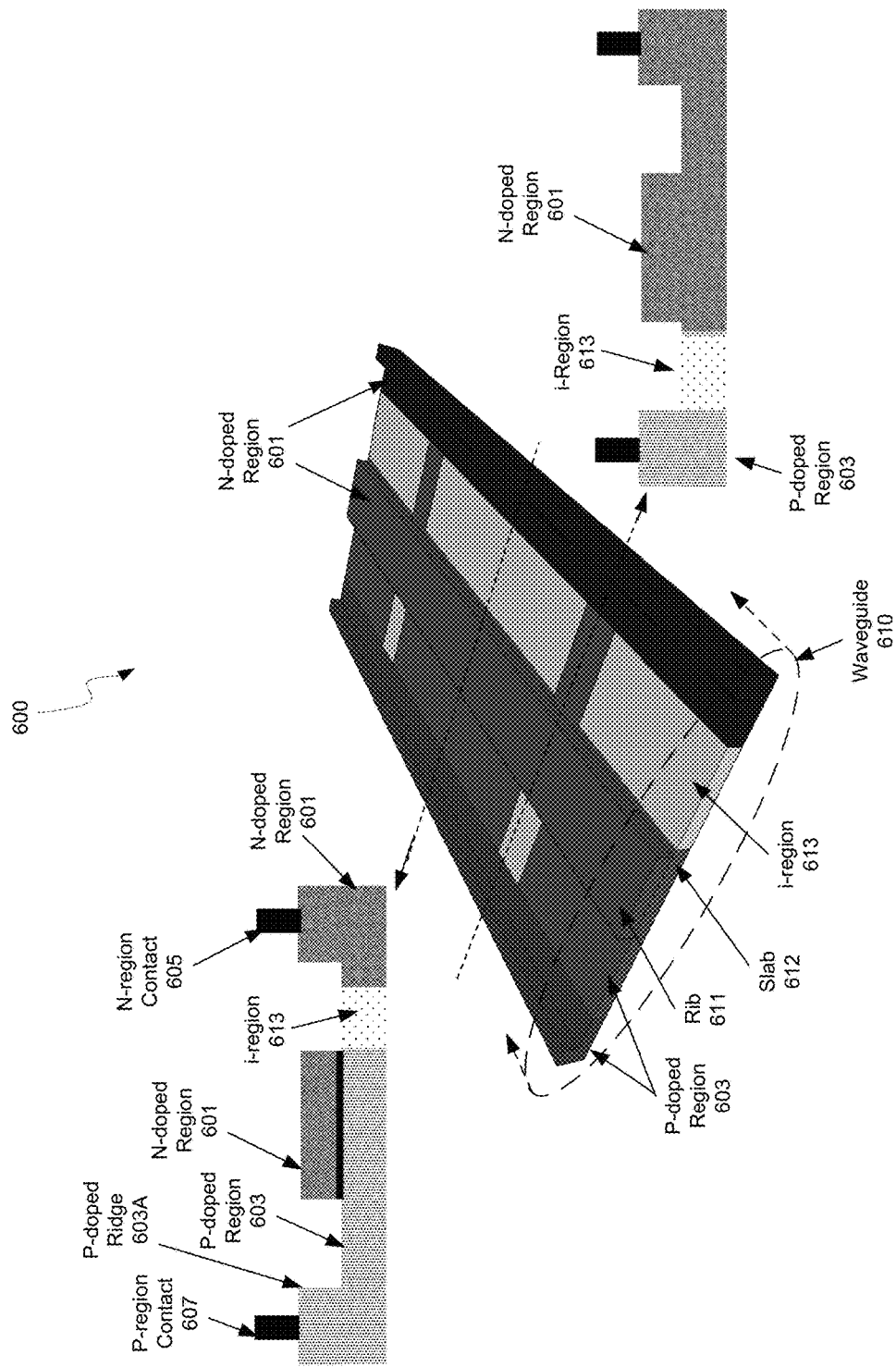
FIG. 6 illustrates yet another example connection scheme for a vertical junction HSPM, in accordance with an example embodiment of the disclosure.

FIG. 6 illustrates yet another example connection scheme for a vertical junction HSPM, in accordance with an example embodiment of the disclosure. Referring to FIG. 6, there is shown an oblique angle view of HSPM 600 with two cross-sectional views at different locations along the rib waveguide, as indicated by the dashed lines. There is also shown waveguide 610 comprising rib 611 and slab 612, which comprise n-doped region 601, p-doped region 603, n-region contact 605, p-region contact 607, and i-region 613. The i-region comprises a nominally undoped, or intrinsic, region.

In the embodiment shown, the junction configuration is varied along the waveguide 610, such that the top of the waveguide 610 is completely n-doped, for example, through its length, while most of the bottom of the waveguide, in the slab section 612, is p-doped except for narrow regions to contact the n-region on top. This is illustrated by the upper left image corresponding to one of the narrow stripes of n-doping in the slab region 612 in addition to the rib 611. In addition, on one side of the rib waveguide, (the p-side) most of the cladding is p-doped, connecting the p-doped bottom of the waveguide 610 to the p-doped ridge 603A. The regions where the n-doped bottom of the waveguide would extend into the p-side cladding may be left undoped, or intrinsic, as indicated by the "I" region 613, to reduce loss and capacitance.

On the other side of the waveguide (the n-side) most of the cladding is undoped except for narrow regions of n-doping that connect the n-doped top of the waveguide to the n-doped ridge.

In another example scenario, the p- and n-doped regions may be reversed with n-doped slab regions and p-doped rib.

As with previous embodiments, the contact region width and unit length between contact regions may be configured to trade off modulation efficiency, resistance, and bandwidth, for example. The contact regions may be interspersed periodically, as in at regular distances, or in varying distances along the length of the waveguide.

Figure 7:
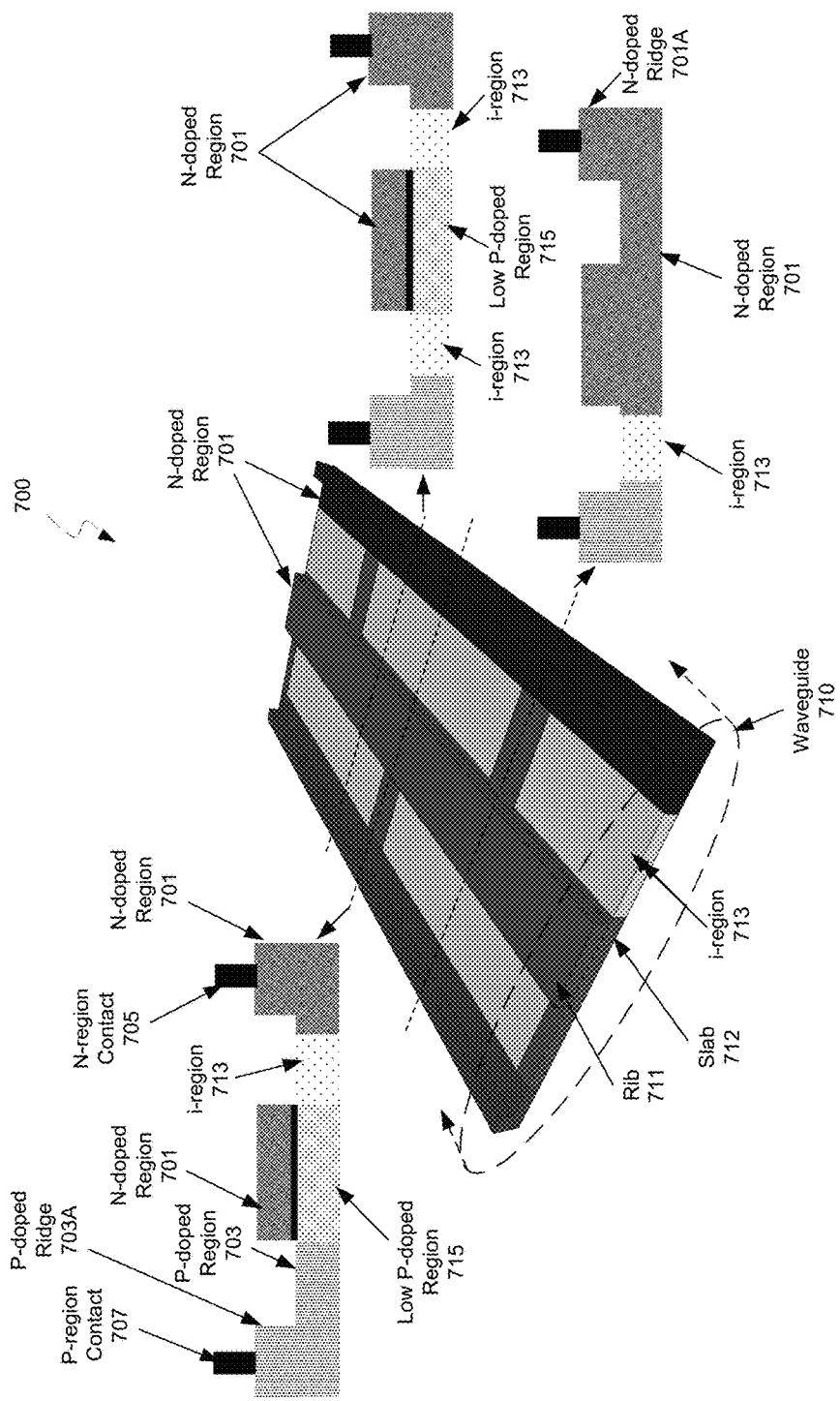
FIG. 7 illustrates yet another example connection scheme for a vertical junction HSPM, in accordance with an example embodiment of the disclosure.

FIG. 7 illustrates yet another example connection scheme for a vertical junction HSPM, in accordance with an example embodiment of the disclosure. Referring to FIG. 7, there is shown an oblique angle view of HSPM 700 with three cross-sectional views at different locations along the rib waveguide, as indicated by the dashed lines. There is also shown waveguide 710 comprising rib 711 and slab 712, which comprise n-doped region 701, p-doped region 703, n-region contact 705, p-region contact 707, i-region 713, and low p-doped region 715. The i-region 713 comprises a nominally undoped, or intrinsic, region.

In the embodiment shown, the junction configuration is varied along the waveguide, such that the rib 711 of the waveguide 710 is completely n-doped, for example, through its length, while most of the bottom of the waveguide, in the slab section 712, is p-doped except for narrow regions to contact the n-region on top. This is illustrated by the upper left image corresponding to one of the narrow stripes of n-doping in the slab region in addition to the rib. In addition, on one side of the rib waveguide, (the p-side) most of the cladding, i.e., the slab, is p-doped, connecting the p-doped bottom of the waveguide to the p-doped ridge 703A. The regions where the n-doped bottom of the waveguide would extend into the p-side cladding may be left undoped, or intrinsic, as indicated by the "I" region 713, to reduce loss and capacitance.

On the other side of the waveguide (the n-side) most of the cladding is undoped except for narrow regions of n-doping that connect the n-doped top of the waveguide to the n-doped ridge 701A. In addition, the doping density in the bottom part of the waveguide can be different from the doping density in the narrow contact regions, as indicated by the low p-doped region 715.

In another example scenario, the p- and n-doped regions may be reversed with n-doped slab regions and p-doped rib.

As with previous embodiments, the contact region width and unit length between contact regions may be configured to trade off modulation efficiency, resistance, and bandwidth, for example. The contact regions may be interspersed periodically, as in at regular distances, or in varying distances along the length of the waveguide.

Figure 8:
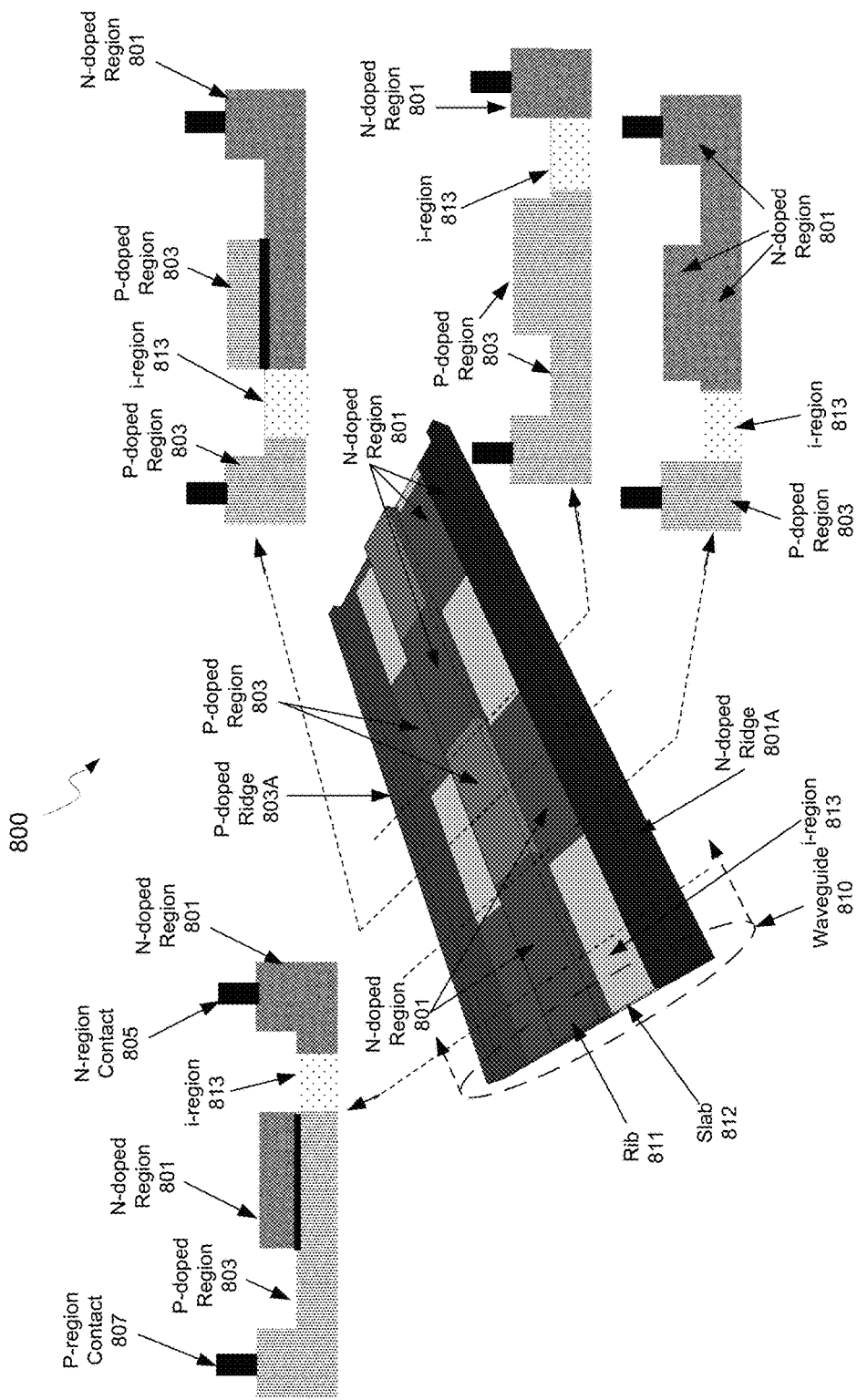
FIG. 8 illustrates yet another example connection scheme for a vertical junction HSPM, in accordance with an example embodiment of the disclosure.

FIG. 8 illustrates yet another example connection scheme for a vertical junction HSPM, in accordance with an example embodiment of the disclosure. Referring to FIG. 8, there is shown an oblique angle view of HSPM 800 with four cross-sectional views at different locations along the rib waveguide, as indicated by the dashed lines. There is also shown waveguide 810 comprising rib 811 and slab 812, which comprise n-doped region 801, p-doped region 803, n-region contact 805, p-region contact 807, and i-region 813. The i-region 713 comprises a nominally undoped, or intrinsic, region, for example.

In the embodiment shown, the junction configuration is varied along the waveguide 810, such that the rib 811 of the waveguide is alternately n-doped and p-doped through its length, while the bottom of the waveguide, in the slab section 812, alternates n-type 801 and intrinsic regions 813 while the other side of the rib 811 in the slab 812 alternates between p-type 803 and intrinsic regions 813. The upper left image corresponds to an n-doped rib 811 and the upper right corresponds to a p-doped rib 811. The lower right images correspond to connection regions where the rib and slab sections are commonly doped to provide electrical connection to the rib 812.

As with previous embodiments, the contact region width and unit length between contact regions may be configured to trade off modulation efficiency, resistance, and bandwidth, for example. The contact regions may be interspersed periodically, as in at regular distances, or in varying distances along the length of the waveguide.

In making connections with vertical junctions, uniformly doped contact regions are introduced. To minimize series resistance, this contact region should not be too narrow, but then this means that a certain fraction of the HSPM waveguide taken up by the contact region will not contribute to phase shift, but will contribute to optical loss, lowering the maximum achievable OMA.

In an alternative scenario, the HSPM may comprise subsequent vertical junction and lateral junction regions. The lateral junction region may be used to contact the vertical junction region but in itself also provides phase shift. Moreover, an extra junction plane arises perpendicular to the propagation direction of the light at the interface between the lateral and vertical junction regions. This is shown further with respect to FIGS. 9 and 10.

Figure 9:
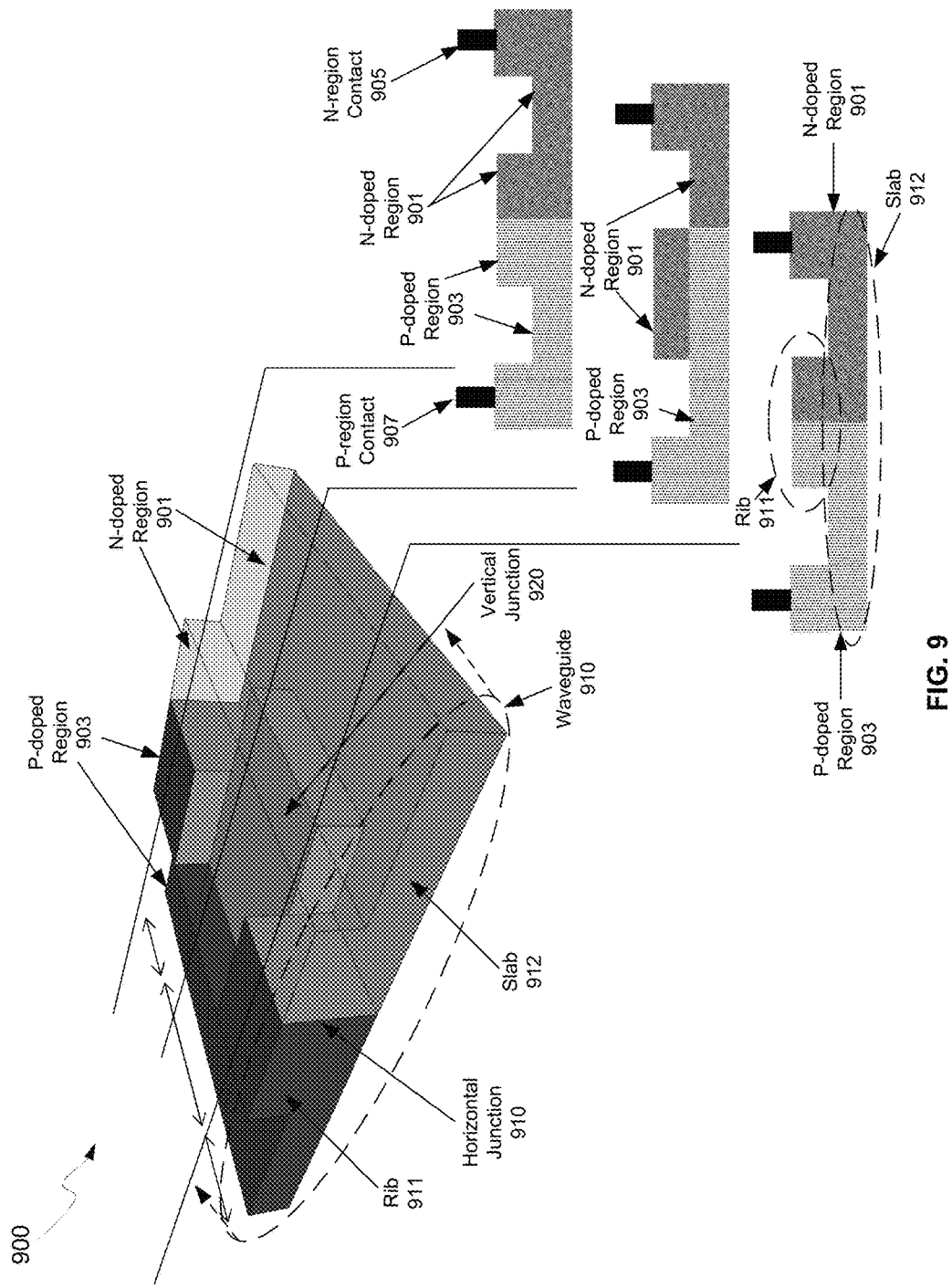
FIG. 9 illustrates an alternating vertical junction/horizontal junction HSPM, in accordance with an example embodiment of the disclosure.

FIG. 9 illustrates an alternating vertical junction/horizontal junction HSPM, in accordance with an example embodiment of the disclosure. Referring to FIG. 9, there is shown HSPM 900 comprising alternating lateral junction and vertical junction regions. There is also shown waveguide 910 comprising rib 911 and slab 912, which comprise n-doped region 901, p-doped region 903, n-region contact 905, and p-region contact 907, with alternating horizontal junctions 910 and vertical junctions 920.

The top left image shows an oblique angle view of a unit cell of the HSPM 900 that is repeated along the light propagation direction. A horizontal junction 910 with p-doped region 903 on the left and n-doped region 901 on the right is shown and a vertical junction 920 with p-doped region 903 at bottom and n-doped region 901 on top is also shown, but a reverse configuration (p top/n bottom and n left/p right) or alternating both orientations is also possible.

Figure 10:
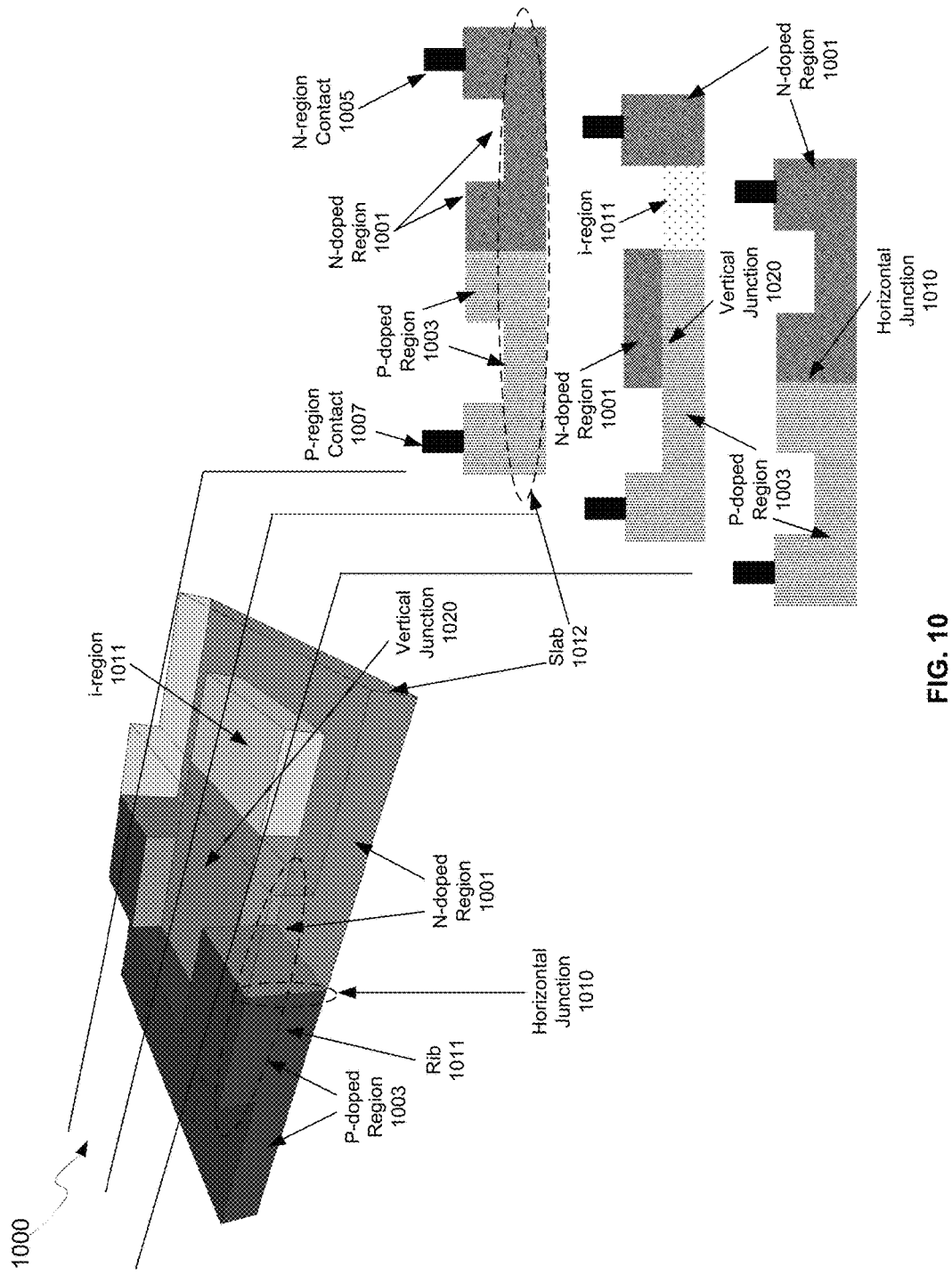
FIG. 10 illustrates another embodiment of an alternating vertical junction/lateral junction HSPM, in accordance with an example embodiment of the disclosure.

FIG. 10 illustrates another embodiment of an alternating vertical junction/lateral junction HSPM, in accordance with an example embodiment of the disclosure. Referring to FIG. 10, there is shown HSPM 1000 comprising alternating lateral junction and vertical junction regions. There is also shown n-doped region 1001, p-doped region 1003, n-region contact 1005, and p-region contact 1007, with alternating horizontal junctions 1010 and vertical junctions 1020.

Referring to FIG. 10, HSPM 1000 may be similar to HSPM 900, but part of the vertical junction 1020 top doping access region (n in this case) is left undoped, as indicated by i-region 1011, to reduce capacitance. In this region, the rib 1011 comprises n-doped region 1001 and the slab 1012 below comprises p-doped region 1003, such that the electric fields from the junction depletion region are oriented vertically.

In an example embodiment, a method and system are disclosed for a vertical junction high-speed phase modulator. In this regard, aspects of the disclosure may comprise a semiconductor device having a semiconductor waveguide that comprises a slab section, a rib section extending above the slab section, and raised ridges extending above the slab section on both sides of the rib section. The semiconductor device also has a vertical pn junction with p-doped material and n-doped material arranged vertically with respect to each other in the rib and slab sections, where the rib section is either fully n-doped or fully p-doped in each cross-section along the semiconductor waveguide. The semiconductor device further has an electrical connection to the p-doped material and n-doped material by forming contacts on the raised ridges, and an electrical connection to the rib section from one of the contacts via periodically arranged sections of the semiconductor waveguide where a cross-section of both the rib section and the slab section in the periodically arranged sections is fully n-doped or fully p-doped.

The rib section may be fully n-doped or fully p-doped along a full length of the semiconductor waveguide. The rib section may alternate between fully p-doped or fully n-doped in sections along a full length of the semiconductor waveguide. The slab section may alternate between fully p-doped or fully n-doped in sections along a full length of the semiconductor waveguide. The slab section may be fully n-doped or fully p-doped along a full length of the semiconductor waveguide except for in the periodically arranged sections. The raised ridges may be separated from the rib by trenches. The semiconductor waveguide may comprise a first phase modulation section of an optical modulator.

Other aspects of the disclosure may comprise a semiconductor device having semiconductor waveguide comprising a slab section, a rib section extending above the slab section, and raised ridges extending above the slab section on both sides of the rib section. The semiconductor device also has a vertical pn junction with p-doped material and n-doped material arranged vertically with respect to each other in the rib and slab sections, respectively, where the rib section is either fully n-doped or fully p-doped in each cross-section along the semiconductor waveguide. The semiconductor device further has an electrical contact to the p-doped material and n-doped material via contacts on the raised ridges and an electrical contact to the rib section from one of the contacts via periodically arranged sections of the semiconductor waveguide where a cross-section of both the rib section and the slab section in the periodically arranged sections is mostly n-doped with an undoped portion or is mostly p-doped with an undoped portion.

Further aspects of the disclosure may comprise a semiconductor device having a semiconductor waveguide comprising a slab section, a rib section extending above the slab section, and raised ridges extending above the slab section on both sides of the rib section. A first portion of the semiconductor waveguide has a vertical pn junction with p-doped material and n-doped material arranged vertically with respect to each other in the rib and slab sections, respectively, where the rib section is either fully n-doped or fully p-doped along the semiconductor waveguide in the first portion. A second portion of the semiconductor waveguide has a horizontal pn junction with p-doped material and n-doped material arranged laterally with respect to each other in both the rib and slab sections. The semiconductor device also has an electrical contact to the p-doped material and n-doped material via contacts on the raised ridges. A portion of the slab section in the second portion of the semiconductor waveguide may be undoped. The undoped portion of the slab section may be between the raised ridges and the rib section. The raised ridges may be separated from the rib by trenches. The semiconductor waveguide may comprise a first phase modulation section of an optical modulator.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A semiconductor device, the device comprising:
   a semiconductor waveguide comprising a slab section, a rib section extending above the slab section, and raised ridges extending above the slab section on both sides of the rib section;
   a vertical pn junction with p-doped material and n-doped material arranged vertically with respect to each other in the rib and slab sections, wherein the rib section is either fully n-doped or fully p-doped in each cross-section along the semiconductor waveguide;
   contacts on the raised ridges that enable electrical connection to the p-doped material and n-doped material; and
   wherein one of the contacts enables electrical connection to the rib section via periodically arranged sections of the semiconductor waveguide where a cross-section of both the rib section and the slab section in the periodically arranged sections is fully n-doped or fully p-doped.

2. The device according to claim 1, wherein the rib section is fully n-doped or fully p-doped along a full length of the semiconductor waveguide.

3. The device according to claim 1, wherein the rib section alternates between fully p-doped or fully n-doped in sections along a full length of the semiconductor waveguide.

4. The device according to claim 1, wherein the slab section alternates between fully p-doped or fully n-doped in sections along a full length of the semiconductor waveguide.

5. The device according to claim 1, wherein the slab section is fully n-doped or fully p-doped along a full length of the semiconductor waveguide except for in the periodically arranged sections.

6. The device according to claim 1, wherein the raised ridges are separated from the rib by trenches.

7. The device according to claim 1, wherein the semiconductor waveguide comprises a first phase modulation section of an optical modulator.

8. A method for communication, the method comprising:
   in a semiconductor waveguide comprising:
     a slab section, a rib section extending above the slab section, and raised ridges extending above the slab section on both sides of the rib section;
     a vertical pn junction with p-doped material and n-doped material arranged vertically with respect to each other in the rib and slab sections, wherein the rib section is either fully n-doped or fully p-doped in each cross-section along the semiconductor waveguide;

contacts on the raised ridges to enable an electrical connection to the p-doped material and n-doped material; and wherein one of the contacts enable an electrical connection to the rib section from via periodically arranged sections of the semiconductor waveguide where a cross-section of both the rib section and the slab section in the periodically arranged sections is fully n-doped or fully p-doped:

receiving a continuous-wave optical signal in the semiconductor waveguide; and generating a modulated optical signal by applying a modulating voltage to the contacts.

9. The method according to claim 8, wherein the rib section is fully n-doped or fully p-doped along a full length of the semiconductor waveguide.

10. The method according to claim 8, wherein the rib section alternates between fully p-doped or fully n-doped in sections along a full length of the semiconductor waveguide.

11. The method according to claim 8, wherein the slab section alternates between fully p-doped or fully n-doped in sections along a full length of the semiconductor waveguide.

12. The method according to claim 8, wherein the slab section is fully n-doped or fully p-doped along a full length of the semiconductor waveguide except for in the periodically arranged sections.

13. The method according to claim 8, wherein the raised ridges are separated from the rib by trenches.

14. The method according to claim 8, wherein the semiconductor waveguide comprises a first phase modulation section of an optical modulator.

* * * * *